(12) United States Patent
Cheben et al.

(10) Patent No.: US 8,351,043 B2
(45) Date of Patent: Jan. 8, 2013

(54) PLANAR WAVEGUIDE WAVELENGTH DISPERSIVE DEVICES WITH MULTIPLE WAVEGUIDE INPUT APERTURE

(75) Inventors: Pavel Cheben, Ottawa (CA); Siegfried Janz, Ottawa (CA); Miroslaw Florjanczyk, Kanata (CA); Dan-Xia Xu, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 586 days.

(21) Appl. No.: 12/531,338

(22) PCT Filed: Mar. 20, 2008

(86) PCT No.: PCT/CA2008/000526
§ 371 (c)(1),
(2), (4) Date: Sep. 15, 2009

(87) PCT Pub. No.: WO2008/113176
PCT Pub. Date: Sep. 25, 2008

(65) Prior Publication Data
US 2010/0110443 A1    May 6, 2010

Related U.S. Application Data

(60) Provisional application No. 60/907,127, filed on Mar. 22, 2007, provisional application No. 60/935,554, filed on Aug. 17, 2007.

(51) Int. Cl.
*G01J 3/45* (2006.01)
*G01B 9/02* (2006.01)

(52) U.S. Cl. .................... 356/454; 356/480
(58) Field of Classification Search .............. 356/451, 356/454, 477, 480
See application file for complete search history.

(56) References Cited

U.S. PATENT DOCUMENTS

| | | | |
|---|---|---|---|
| 5,239,598 A | 8/1993 | Wight et al. | |
| 5,615,008 A * | 3/1997 | Stachelek | 356/301 |
| 6,175,671 B1 * | 1/2001 | Roberts | 385/14 |
| 6,522,812 B1 * | 2/2003 | Nikonov | 385/37 |
| 6,590,684 B1 * | 7/2003 | Goodfellow | 398/149 |
| 7,317,535 B2 * | 1/2008 | Cheben et al. | 356/451 |
| 2002/0054294 A1 * | 5/2002 | Ahmadvand et al. | 356/477 |
| 2004/0096151 A1 | 5/2004 | Svilans et al. | |
| 2004/0207855 A1 * | 10/2004 | Brady et al. | 356/451 |
| 2006/0039704 A1 * | 2/2006 | Nara et al. | 398/161 |
| 2006/0153498 A1 | 7/2006 | Shen | |

* cited by examiner

*Primary Examiner* — Gregory J Toatley
*Assistant Examiner* — Dominic J Bologna
(74) *Attorney, Agent, or Firm* — Marks & Clerk; Richard J. Mitchell (57) ABSTRACT

A spectrometer has a multi-input aperture for admitting an input wavefront and an array of multiple waveguide structures terminating at the multi-input aperture. The input wavefront is incident on each of the waveguide structures, which provide a dispersive function for the input wavefront. Interferometers are formed by elements of the waveguide structures. The interferometers have different optical path length differences (OPDs). The interferometers provide a wavelength responsive output for spatially extended light sources. The output of the interferometers is detected with a detector array. The spectrometer has an improved etendue, and in some embodiments very high resolution.

36 Claims, 9 Drawing Sheets

PLANAR WAVEGUIDE WAVELENGTH DISPERSIVE DEVICES WITH MULTIPLE WAVEGUIDE INPUT APERTURE

CROSS REFERENCE TO RELATED APPLICATION

This application claims the benefit under 35 USC 119(e) of prior U.S. application Nos. 60/907,127, filed Mar. 22, 2007 and 60/935,554, filed Aug. 17, 2007, the contents of which are herein incorporated by reference.

FIELD OF THE INVENTION

This application relates to spectrometers and more specifically to waveguide based spectrometers.

BACKGROUND

Waveguide-based spectrometers capable of separating light signals at different wavelengths have already been established as one of the key technologies in wavelength division multiplexed telecommunications networks (wavelength multiplexers and demultiplexers, add-drop filters, channel monitors, etc.). High-resolution spectroscopic devices are also required for the development of new detection platforms for genomics and health related applications, and environmental monitoring, including space-born sensing.

In grating spectrometers, high resolution is achieved by reducing the input slit width, or the input waveguide width in planar waveguide based devices. However, a reduction in the input aperture invariably results in a reduced light throughput (étendue) because of a degraded light coupling efficiency between the delivery system (typically an optical fiber) and the spectrometer. The problem is even more obvious when using optical fibers with large core area (multimode fibers). Such fibers are typically used for efficient harvesting of light at the input end of the delivery fiber.

In addition to these étendue concerns, it is known that the input waveguide width cannot be reduced below the point at which the confinement of the mode is compromised and mode delocalization occurs. This sets an ultimate limit to a grating-based waveguide spectrometer resolution. One solution to overcome this fundamental resolution limit is to abandon altogether the slit imaging microspectrometer concept.

Diffraction gratings or arrayed waveguide gratings are commonly used to disperse the spectrum of optical radiation into different wavelength components in the focal plane of a spectroscopic instrument. Several grating-based microspectrometers have been demonstrated as shown by the following references: S. H. Kong et al., IEEE Instrument. & Measurement Mag. Vol. 4, pp. 34-38 (2001); P. Krippner et al., SPIE Vol. 2783, pp. 277-282 (1996); J. H. Correia et al., IEEE Trans. on Electron. Devices, Vol. 47, pp. 553-559 (2000); R. V. Kruzelecky et al., SPIE Proc. Vol. 4205, pp. 25-34 (2001); S. H. Kong et al., Sensors and Actuators, Vol. A92, pp. 88-95 (2001); Z. M. Qi et al., Optics Letters Vol. 27, pp. 2001-2003 (2002); D. Sander et al., Sensors and Actuators, Vol. A88, pp. 1-9 (2001); J. M. Harlander, Appl. Optics Vol. 41, No. 7, 1343-1352 (2002); and P. Cheben et al., Opt. Lett., Vol. 30, No. 14, 1824-1826.

However, virtually all of these spectrometers suffer from a limited resolution (typically >1 nm) which is not suitable for high resolution spectroscopies. Even to achieve a moderate performance, including resolution and light gathering capability (étendue), serious fabrication difficulties have to be resolved. For example, microspectrometers fabricated by LIGA process (deep X-ray lithography and micro-electro plating require exceptional high structuring resolution of <0.25 μm across the entire waveguide thickness of about 100 μm. Waveguide inhomogeneities during embossing induce a significant stray light level compromising resolution and crosstalk, and reducing detection accuracy particularly in spectral ranges of low sensitivity. In another reported example of an on-chip microspectrometer, bulk micromachining of silicon is used to create an array of Fabry-Pérot interferometers, yielding a limited number of available spectral bands (<20) and modest resolution (~2 nm). The latter is due to difficulties with fabrication of micro-mirror surfaces with high surface quality, parallelism and reflectivity.

Commercial portable micro-spectrometer systems exist, such as the Ocean Optics S1000 and S2000 series, the microParts LIGA serie, the Carl Zeiss MMS1, IOSPEC by MPB Technologies, and the Elargen micro-lightguide spectrometer, but their use is again limited to spectroscopic application with low resolution. Increasing the resolution in these devices is inevitably accompanied by degrading light throughput rendering these devices useless for high-sensitivity high-resolution applications.

It is known that Fourier transform (FT) spectrometers outperform by several orders of magnitude the light gathering capability (étendue) of grating spectrometers at a comparable spectral resolution. Unfortunately, typical FT spectrometers require moving parts, which is very difficult to realize in an integrated optics version, although recently, a new FT spatial heterodyne spectrometer with no need for moving part has been demonstrated both in bulk optics and planar waveguide form.

Miniature spectrometers are typically bulk optic devices composed of lenses, mirrors and other large optical components. As such they are large and require careful assembly for each device. The actual physical layout of the device is somewhat complex and involves making compromises in resolving power, etendue and size to get a working device. In echelle waveguide grating devices, some complex fabrication steps are required to create waveguide vertical trenches with smooth vertical sidewalls. In an arrayed waveguide grating device, the waveguide lengths need to be fabricated within very tight tolerances. In these devices, the etendue is limited and single input aperture is used.

SUMMARY OF INVENTION

It is an object of the invention to provide a spectrometer with increased étendue.

According to the present invention there is provided a spectrometer comprising an multi-input aperture for admitting an input wavefront; an array of multiple waveguide structures terminating at said multi-input aperture such that said input wavefront is incident on each of said waveguide structures, and wherein said waveguide structures provide a dispersive function for said input wavefront and elements of said waveguide structures form a plurality of interferometers, each having an optical path length difference (OPD) between optical paths therein, and wherein the OPDs for said interferometers are different, and wherein said interferometers provide a wavelength responsive output for spatially extended light sources; and a detector array receiving an output of said plurality of interferometers.

The use of a multi-input aperture input solves the problem of etendue because it allows the spectrometer to be used with spatially extended light source and thus maximizes the total light gathering capacity. Unlike the case of an conventional arrayed waveguide spectrometer, for example, the incoming light does not need to be focused on to a small aperture.

The optical path difference is determined by the delays in the respective optical paths.

In one embodiment the interferometers, also referred to herein by the coined term interferands, can be pairs of waveguides coupled together to as Mach-Zehnder interferometers, in which case the outputs of the interferometers are directed toward separate photodetectors. The spectral composition of the light source can be determined by digitally processing the outputs of the interferometers. It is also possible to superimpose all the outputs and detect the superimposed output with common detector, and determine the spectral composition of the light source by analyzing the resulting interference fringes. In either case the delays introduced by the spectrometers should increase (or decrease incrementally across the array).

In another embodiment, the interferometers can be formed by Fabry Perot interferometers of varying delay. Fabry Perot interferometers have OPDs determined by the spacing of the cavity mirrors due to the multiple reflections occurring within the cavity. In the case of a Fabry Perot interferometer, the cavities of the different FPIs have different lengths and thus introduce different delays.

In yet another embodiment, the interferometers can be made of optical fibers, either arranged in pairs, or in a pair of bundles. In either case, the resolution of the spectrometer, which is dependent on the length of the waveguides, can be made extremely large because the optical fibers can be made of almost any length, potentially kilometers long.

It is another object of the invention to relax the fabrication tolerances on waveguide lengths and optical path errors.

In another aspect the invention provides a method of analyzing the spectral composition of an input wavefront, comprising admitting a wavefront from a spatially extended source into a multiple input aperture comprising a plurality of waveguides; causing interference between light traveling along said waveguides; and analyzing the spectral composition from the resulting interference.

Embodiments of the invention contribute to the reduction of errors by permitting simple software calibration. Embodiments of the invention also provide optical apodization by simple software calibration.

In the embodiments of the invention, the waveguides can be incorporated in vertically stacked chips.

Embodiments of the invention offer a larger optical throughput and a compact layout, and a simpler readout method.

Spectrometers in accordance with the invention can be made using standard waveguide fabrication techniques to provide a robust device.

It will be understood that the reference to light herein is not restricted to visible light, but includes radiation of any wavelength suitable for analysis by a spectrometer.

A spatially extended source is one which does not appear as a point source to the input aperture. That is the source of the incoming light appears spread out over a finite and detectable distance.

BRIEF DESCRIPTION OF THE DRAWINGS

The invention will now be described in more detail, by way of example only, with reference to the accompanying drawings, in which:—

DETAILED DESCRIPTION OF THE INVENTION

The above mentioned drawbacks can be overcome by using a spectrometer with multiple input waveguides. Intercepting incoming light by multiple input waveguides allows maximizing total light gathering capability (étendue).

Figure 1:
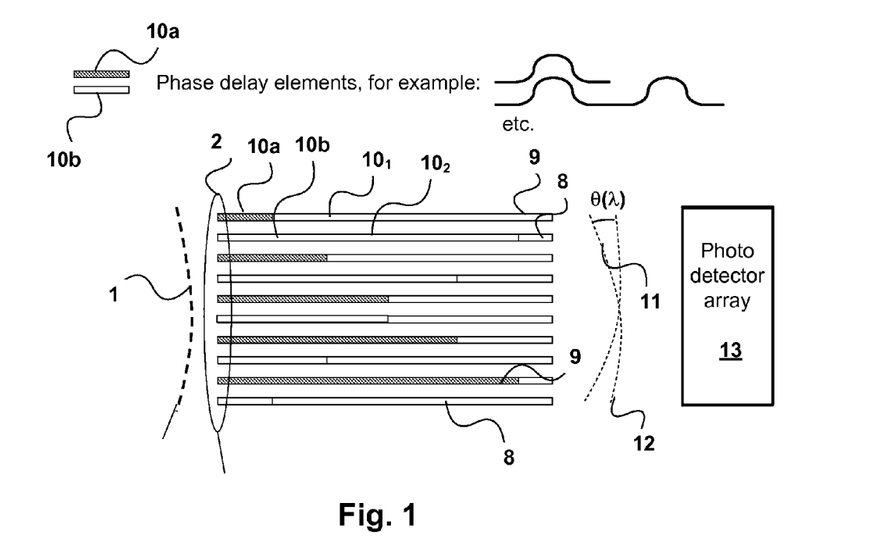
FIG. 1 illustrates a first embodiment of the invention with interleaved waveguides arrays.

The spectrometer shown in FIG. 1 in schematic form comprises two interleaved waveguide arrays 8, 9 formed by alternate waveguide elements 10 constructed in a slab waveguide having an input aperture 2. The waveguides of the first array 8 introduce a delay 10a, which progressively increases across the array while the waveguides of the second array 8, introduce a delay 10b, which progressively decreases across the array in a complementary manner, so that the arrays create interference orders m and −m, respectively, thus combining two dispersive systems of opposite signs. The adjacent waveguide pairs can also be considered as individual waveguide structures forming interferometers, the outputs of which are superimposed to form output wavefronts 11, 12 which are detected by photodetector array 13. The interleaved waveguide arrays 8, 9 are designed such that at a given wavelength of an input wavefront 1, two wavefronts 11, 12 emerge parallel from the respective (interleaved) waveguide arrays 8, 9, and a zero spatial frequency fringe is formed where the two wavefronts overlap. When the wavelength is changed, two wavefronts rotate each in a different direction, producing a nonzero angle between the two wavefronts and a corresponding fringe pattern, different wavelengths yielding fringes of different spatial frequencies—this allows the separation of the different wavelengths. The spectrum is obtained by Fourier transformation of the fringe pattern. The fringe pattern can be read-out by an array of waveguides, a photodetector array, or other read-out devices known in the art as illustrated further on.

An advantage of this arrangement is that, due to its differential nature, the spatial frequency of the fringes and hence spectrometer spectral response is largely tolerant to input wavefront parameters, such as wavefront tilt and curvature, aberrations, etc. The output is thus wavelength sensitive even in the presence of a spatially extended source, wherein the input light covers all or a major part of the multiport input aperture.

Figure 2:
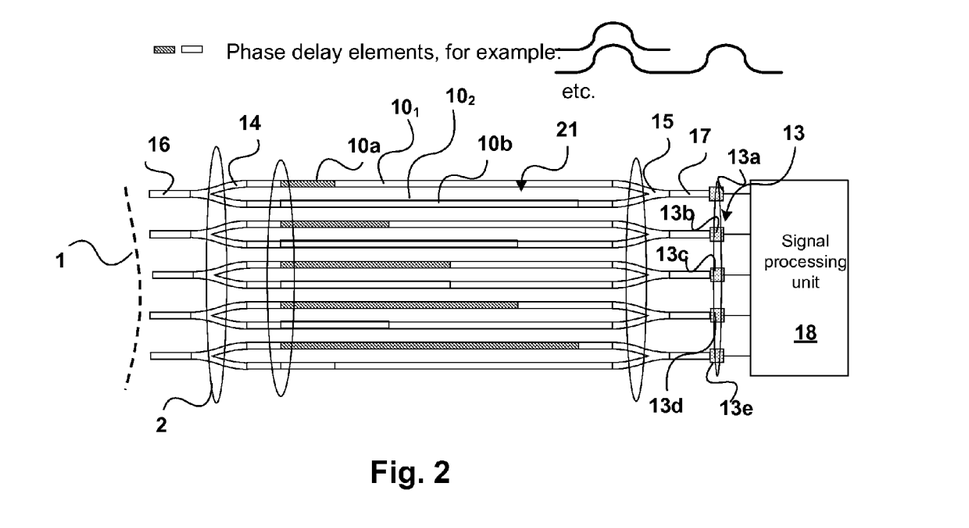
FIG. 2 illustrates a second embodiment of the invention where the adjacent waveguides of two interleaved waveguide arrays are joined together.

In a further embodiment, of the multi-waveguide aperture spectrometer shown in FIG. 2, adjacent waveguide pairs of two interleaved waveguide arrays 8, 9 are joined together, i.e. waveguides $10_1$, $10_2$ of arrays 8 and 9 in the input or the output of the waveguide array, or both, by a waveguide couplers 14, 15. Each waveguide structure formed by the pairs of waveguides $10_1$, $10_2$ has a common input waveguide 16 and a common output waveguide 17. By joining the waveguides at the output of the array, the light is recombined by interference directly in the channel waveguide, and not in a slab waveguide or free space as in the case of device shown in FIG. 1.

The recombined optical signal is intercepted by a photodetector array 13. The light from each waveguide pair can be detected by a distinct photodetector cell 13a, 13b, 13c, 13d, 13e, or a group of cells, rendering a distinct Fourier component of the signal. Different Fourier components corresponding to different photodetector cells are superposed numerically or electronically, according to principle of Fourier theory, and the light spectrum is obtained. The interference order can be chosen as in the embodiment shown in FIG. 1, i.e. with a constant optical path difference between adjacent waveguide pairs. Nevertheless, since in the embodiment shown in FIG. 2 the signal from each waveguide pair is detected separately, the path change between the adjacent waveguide pairs is not limited to a constant value and may vary between different waveguide pairs. If a single wavelength is applied to any of the waveguide structures 21 formed from the waveguide elements $10_1$, $10_2$, the output at the corresponding cell of the photodetector will vary as the wavelength is varied in a predictable manner. The variation will be different for each waveguide structure depending on the delays in the waveguides because each waveguide pair is acting as an interferometer. In the case of a broadband source, the spectral composition can be calculated by digitally processing the outputs from the photocells signal processing/analysis unit 18, which can, for example, be a digital signal processor.

In all the embodiments, various devices known in art can be used as the waveguide couplers, including but not limited to y-coupler, directional coupler, and multimode interference (MMI) coupler.

In all the embodiments, fan-in and fan-out input waveguide sections can be included to match the waveguide array dimension to the input aperture size and the output readout circuit size, respectively.

The required phase delays can be obtained simply by using curved waveguides where the curve would be selected to change the phase of the light transmitted through the waveguide while avoiding bend losses, as is schematically shown in FIG. 1 or 2. Other methods known in the art can also be used. Examples include, but are not restricted to, the insertion sections of photonic crystal waveguides into the waveguide path, waveguide sections of different widths, or resonator structures such as mirror or ring resonators coupled to the waveguide.

Pairing the waveguides also eliminates the need for filtering higher order modes (m±1, m±2, etc.) that may exist in conventional waveguide arrays where each waveguide represent a separate output sub-aperture. It is advantageous to use a directional or MMI coupler to avoid 3 dB coupling loss and to obtain both the in-quadrature and the out-of-quadrature signals. Since the sum of these two signals is proportional to the input fluence, it can be used for calibrating purpose as well as for apodization. Apodization can be used to reduce sidelobes in the spectral domain, and hence the crosstalk between different spectral components. By software adjustment of the weight factor for each Fourier component according to the Fourier theory, the sidelobes can be mitigated without the need for input aperture apodization.

In preferred embodiments of the invention, each input waveguide delivers light to an independent "interferand", where the "interferand" can be any waveguide structure with a periodic and wavelength dependent transfer function. Although many such structures known in the art can be used in this invention, here we illustrate an embodiment of this invention on three specific interferand examples, namely Mach-Zehnder interferometer (MZI), waveguide directional coupler and waveguide Fabry-Perot interferometer (FPI).

Figure 3:
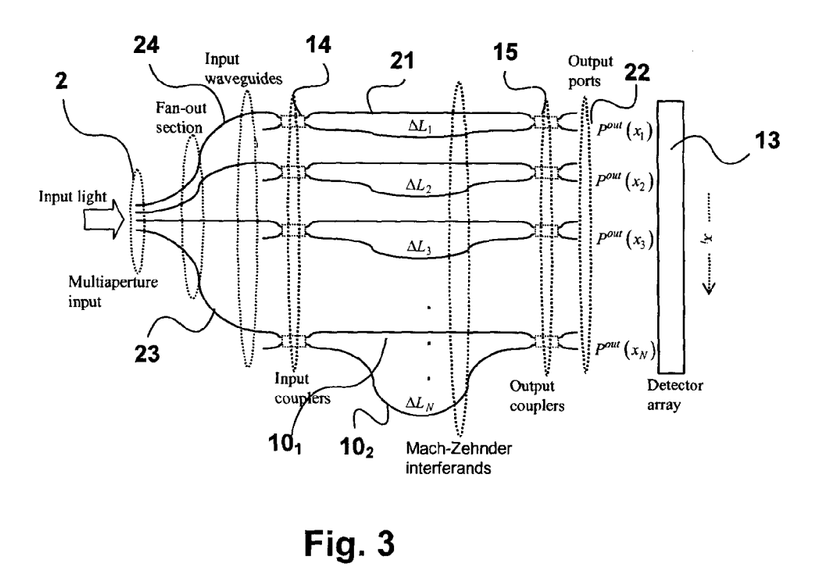
FIG. 3 illustrates an embodiment of the invention having an arrayed waveguide Mach-Zehnder interferometer.

FIG. 3 shows a preferred embodiment of the general paired waveguide embodiment shown FIG. 2, with both the input and the output waveguides of each waveguide pair joined together to form an array of Mach-Zehnder type interferands 21, each comprising waveguide elements $10_1$, $10_2$.

As is the case for the embodiment shown in FIG. 3, the waveguide elements $10_1$, $10_2$ are joined together at each end by couplers 14, 15. The output couplers 15 direct the light to output ports 22 for detection by detector array 13, which detects the individual output signals $P^{out}(\chi_1)$ etc.

In this embodiment, input light is directed through multi-input aperture input port 1 to a fan-out section 23 consisting of waveguides 24 leading to the individual interferands 21 consisting of the Mach-Zehnder interferometers.

The Mach-Zehnder interferometer (MZI) is an established device both in bulk optics and waveguide implementations, with applications including spectral filtering, signal modulation and sensing. It has a periodic transmission characteristic which is a function of the phase delay between the two interferometer arms. The phase delay is readily achieved by making one of the arms longer than the other, thus making the interferometer unbalanced. The optical path difference can be well controlled by the photolithographic processes of waveguide fabrication.

Figure 4:
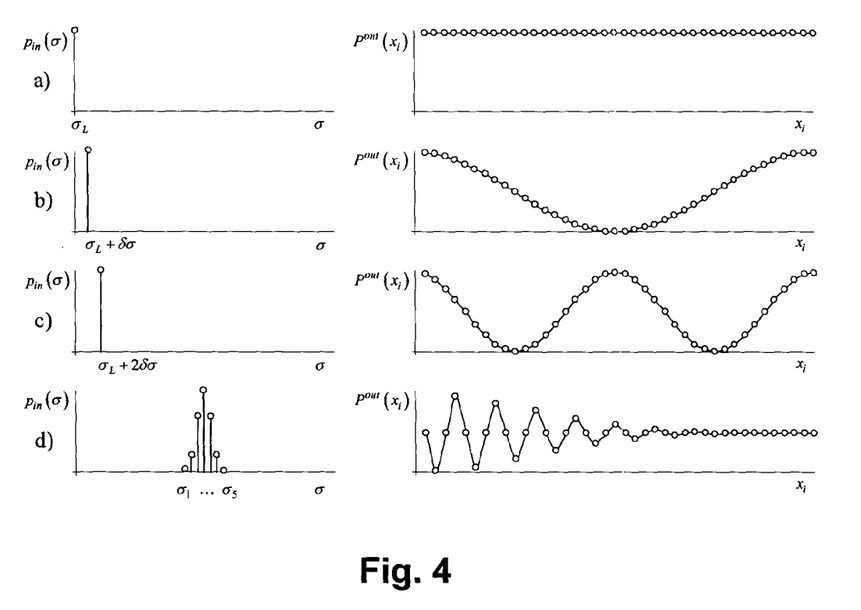
FIG. 4 illustrate different spectral inputs (left) and the corresponding spatial power distributions at the spectrometer output ports (right).

Alternatively, a modification of the refractive index in the waveguide arms can be used. The embodiment in FIG. 3 shows a multi-input aperture array of unbalanced MZI 21 with different path delays $\Delta L_i$. The multi-input aperture is formed by N waveguides each feeding into an individual MZI. The input signal propagates through the arrayed MZIs and, as a result of interference, forms a spatially distributed power pattern across their output ports. The output power distribution is measured by a photodetector array and digitally processed to retrieve the input: spectrum. The path difference $\Delta L_i$ in the MZI array changes by a constant increment across the array, though varying increments may also be used. For a given monochromatic input, different transmission characteristics of each MZI results in a different power value at its output. In general, a monochromatic input results in a periodic (sinusoidal) spatial distribution of power across the different output ports $P^{out}(x_i)$ that is the Fourier-transform of the monochromatic input spectrum. Since the spatial power distribution $P^{out}(x_i)$ and the input spectrum are a Fourier transform pair, a polychromatic input produces a power distribution from which the input spectrum can be calculated using Fourier transformation. It is noticed that the interferometer array can be designed such that for a particular monochromatic input of a wavenumber $\sigma_L=1/\lambda_L$, a constant spatial power distribution is obtained at the output, as shown in FIG. 4a. This is denoted as the Littrow condition, with the zero spatial frequency corresponding to the Littrow wavenumber $\sigma_L$. At the Littrow condition, the phase delays in different MZIs are integer multiples of $2\pi$, thus yielding the constant $P^{out}(x_i)$. As the wavenumber of the monochromatic input $\sigma$ changes from the Littrow value, the output power distribution becomes periodic with the spatial frequency increasing with $|\sigma-\sigma_L|$. Changing the wavenumber from the Littrow condition to $\sigma_L+\delta\sigma$, where $\delta\sigma$ is the instrument resolution, results in one spatial fringe along the output ports as shown in FIG. 4b. Similarly, the light signal of wavenumber $\sigma L+2\delta\sigma$ produces two spatial fringes, FIG. 4c, and so on—monochromatic inputs with different wavenumbers result in different periodic patterns. Since a polychromatic signal can be represented by superposition of monochromatic constituents, a corresponding fringe pattern is formed by superposition of the respective periodic fringes, as illustrated in FIG. 4d. The parameter $\delta\sigma$ is inversely proportional to the maximum path delay $\Delta L_{max}$.

Light of wavenumbers equally spaced above and below the Littrow value produces the same fringe pattern. To avoid this ambiguity, the light with wavenumbers below $\sigma_L$ can be blocked by a bandpass filter. The spatial fringes can be regarded as single-sided interferograms from which the input spectra can be retrieved assuming the pattern is symmetric with respect to the point of origin (x=0). It is observed that the device heterodynes the spatial interference pattern with respect to the Littrow wavenumber $\sigma_L$. The input spectrum and the output spatial distribution are related through an invertible linear transform, namely the Fourier cosine transform.

Figure 5:
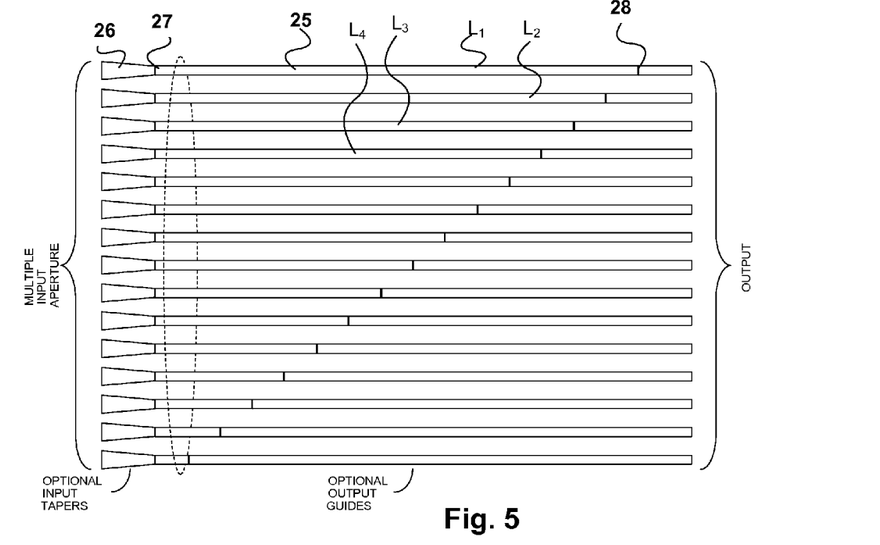
FIG. 5 illustrates an embodiment of the invention having an arrayed waveguide Fabry-Perot interferometer.

FIG. 5 shows an embodiment with the interferands comprising an array of Fabry Perot (FP) waveguide structures 25 of different lengths formed in a chip or slab (not shown). The FPI structures are arranged to form a parallel array of non-coupled waveguides. Like the Mach-Zehnder interferometers, the FPIs have transmission characteristics that are a periodic function of wavelength. This can be controlled by changing optical phase delay in the FP cavity, for example by changing cavity length (as shown in FIG. 5) or the effective index. It is advantageous to use FPI with lengths $L_1, L_2, L_3, L_4$ etc. differing from one structure to another by a constant increment, but varying length increment can also be used. The incoming light is coupled via input tapers 26 (optional) in the multiple input aperture 1 to the array of Fabry-Perot interferometers 25 and is coupled out of the chip through an array of output waveguides (optional).

Each waveguide FPI is formed by two semitransparent facets, the input facet 27 and the output facet 28 with a waveguide cavity between them. FPIs in the array have different optical cavity lengths. They each operate independently, but sample different spatial parts of the same input signal. The input intensity distribution is controlled by an optical input system that provides a specific illumination of the input apertures. The optical power values are evaluated at each of the output apertures. This can be done, for example, by a photodetector array. The input spectral power (input spectrum) is calculated from the measured power values by an inversion method. In the case of low finesse interferometers, the inversion method approximates to the Fourier transform method. The end-facets 28 that form the waveguide FPI can comprise waveguide mirrors with a specific reflectivity, typically in the range of 5-99.999%, preferably 20-80%. This can be implemented with various component technologies, including but not limited to waveguide corner reflectors, turning mirrors, Bragg gratings, photonic crystals, sub-wavelength gratings, metalized or dielectric coatings, etc.

The outputs of the FPIs 25 are detected in a manner similar to the embodiment of FIG. 3. The spectral composition of the input light can then be determined in a similar manner.

Figure 6:
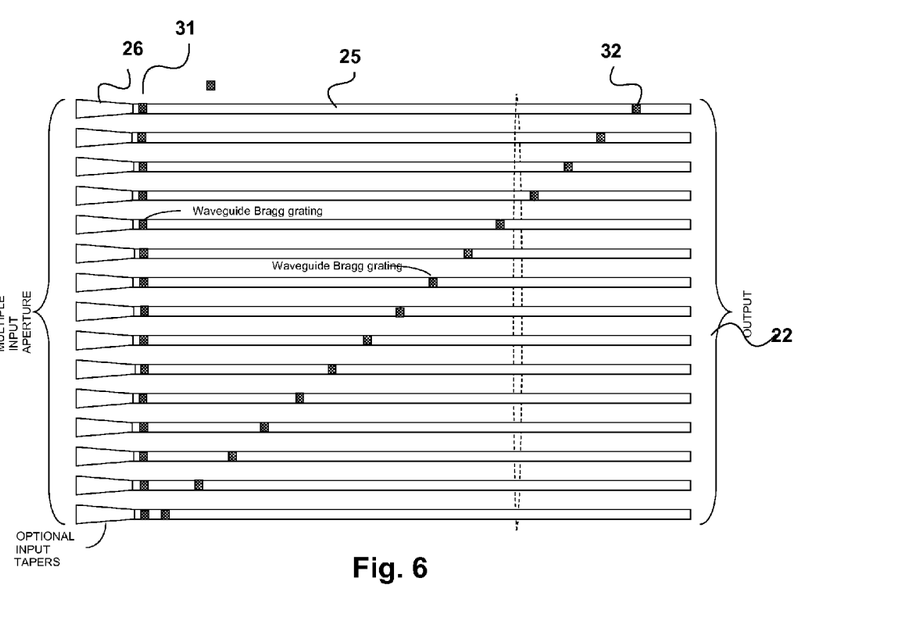
FIG. 6 illustrates an embodiment of the invention having an arrayed waveguide Fabry-Perot interferometer with Bragg gratings.

FIG. 6 shows an embodiment with the interferands comprising an array of Fabry-Perot interferometers with different cavity lengths, each cavity being formed by two waveguide Bragg gratings 31, 32. The waveguide Bragg grating reflectivity is typically in the range of 5-99.999%, preferably 20-80%.

Figure 7:
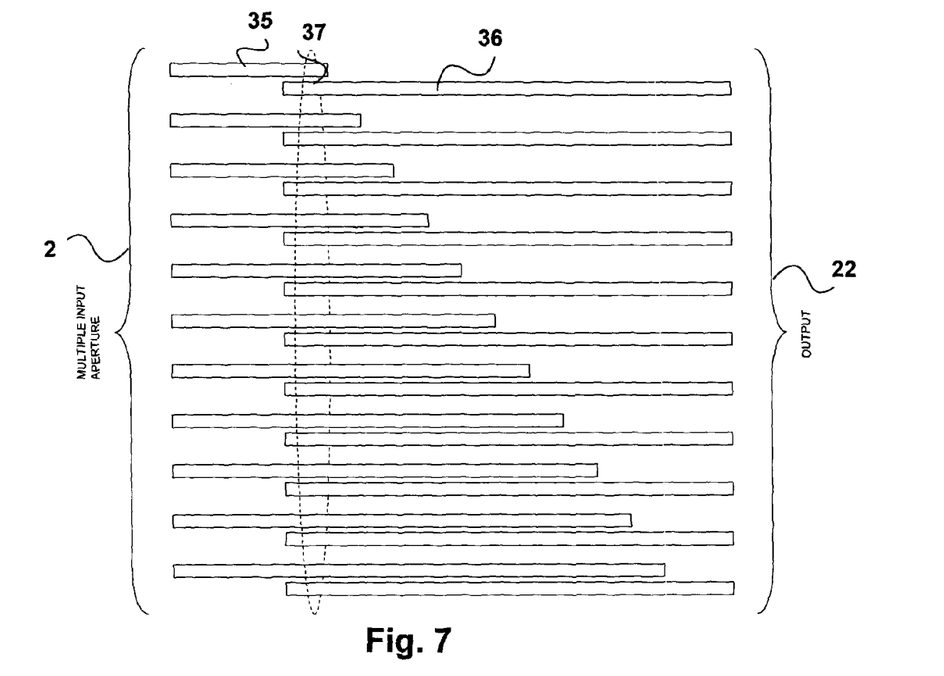
FIG. 7 illustrates an embodiment of a spectrometer where waveguide directional couplers (DC) are used as interferands.

FIG. 7 shows another embodiment of spectrometer where waveguide directional couplers (DC) are used as interferands. In FIG. 7, each waveguide structure consists of a pair of waveguide elements 35, 36 partially overlapping to form a directional coupler (DC) 37. The wavelength dependent response of each interferand can be controlled by varying the length of the directional coupler 37, as shown in FIG. 7. The waveguide structures then function in a similar manner to the Fabry Perot interferometers, each that each structure produces an output that varies periodically with wavelength.

Other DC parameters that affect the spectral response, such as gap between coupled waveguides, material refractive indexes, waveguide cross-sections, stress in the waveguide layers, etc., can also be used to control DC spectral response. The optical power values are evaluated at each of the output apertures. This can be done, for example, by photodetector array. The input spectral power is calculated from the measured power values by the inversion method.

Figure 8:
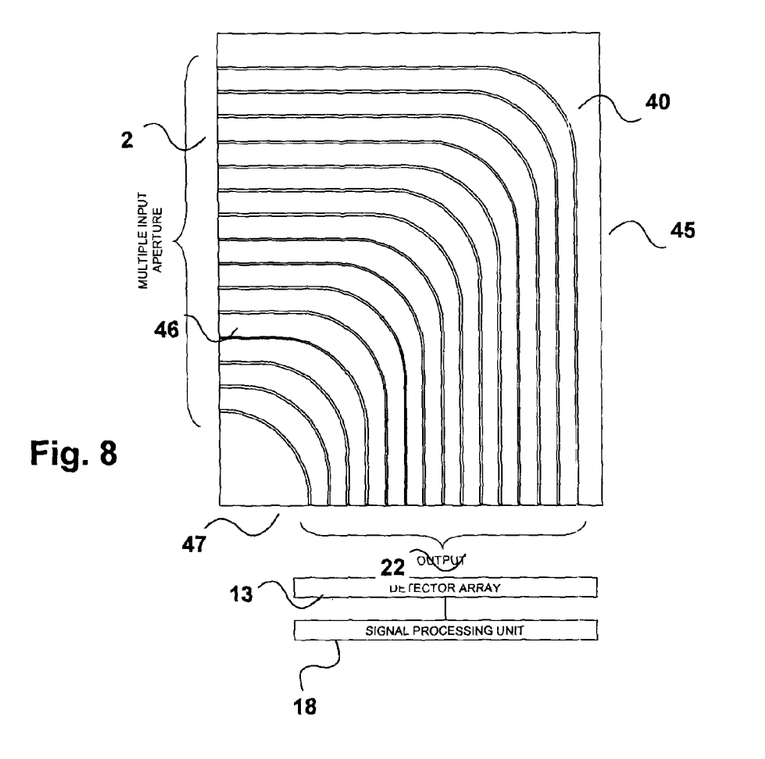
FIG. 8 illustrates an embodiment of a spectrometer where FPI array is formed by an array of elbow waveguides.

FIG. 8 illustrates an embodiment of the spectrometer where an FPI array is formed in a slab or chip by an array of elbow waveguides 40 with a specific, advantageously constant, length increment between adjacent waveguides. Bending the waveguide has an additional advantage of reduced stray light coupling into the output ports. The bends should be such as that the loss of light due to the bends is negligible. The end faces 46, 47 of the slab 45 form the partially reflecting faces of the FPIs. Advantageously, all bends can be identical such that the contribution of all bends is be easily calibrated out. The specific reflectivities at the inputs and outputs of FPI cavities are obtained by semitransparent mirrors directly formed on the input an output edges of the spectrometer.

The mirrors can be formed for example by depositing on the input and output edges 46, 47 metallic and dielectric materials, or by using sub-wavelength waveguide structures with specific reflectivities. For waveguides fabricated in high refractive index materials, for example such as silicon, silicon-on-insulator, and III-V semiconductors, the light reflectivity on the waveguide input and output facets can be directly used, obviating the need for dedicated reflectors. The output light signal is intercepted and evaluated similarly as in the previous embodiment, i.e. using photodetector array and inversion methods.

Figure 9:
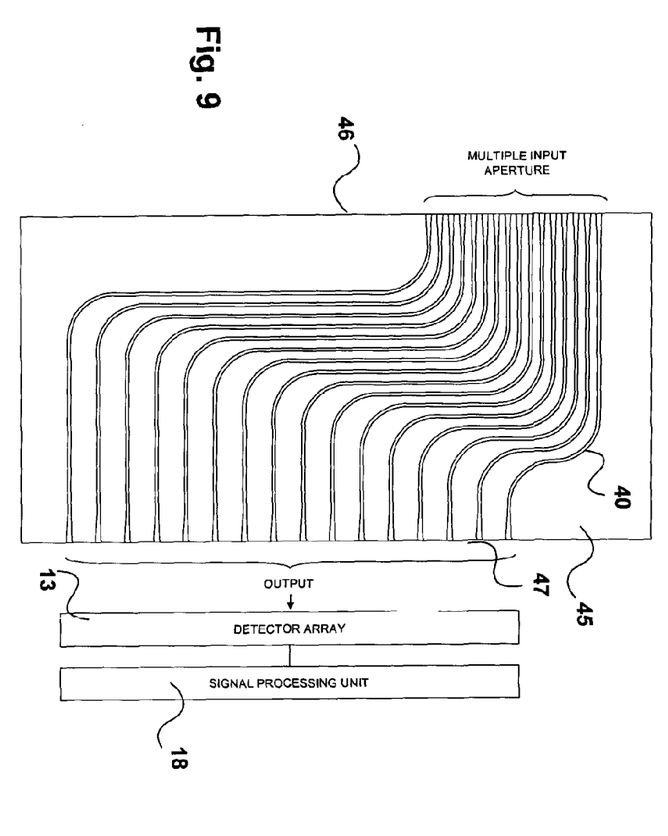
FIG. 9 illustrates an embodiment of a spectrometer where FPI array is formed by an array of double-elbow waveguides.

FIG. 9 illustrates an embodiment of the spectrometer similar to elbow embodiment of FIG. 8, but with double-elbow waveguides 40. This embodiment provides inputs and outputs at the opposite facets 46, 47 of the chip 45.

Figure 10:
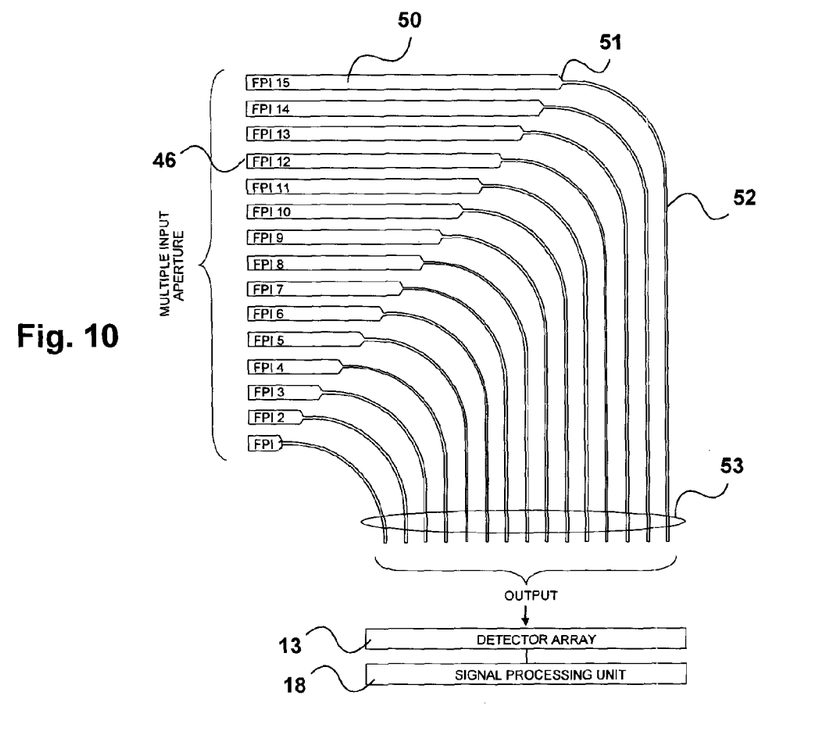
FIG. 10 shows an embodiment of the spectrometer with an array of FPI cavities formed by partially reflecting waveguide mirrors.

FIG. 10 illustrates another embodiment of the spectrometer. As in the previous embodiment, the input facets of the arrayed waveguide FPI coincide with the wafer's edge. The input facets 46 can be modified to obtain desired reflectivity by applying metallic or dielectric coatings or by using sub-wavelength grating structures. In contrast to the previous embodiment, the FPI waveguides 50 are straight and have output facets 51 formed by waveguide corner partial reflectors. Each corner partial reflector has the probing waveguide 52 that guides the transmitted signal to its own output facet 47 which preferably has low reflection. The latter can be obtained using anti-reflective coatings or sub-wavelength structures. The output power is measured at the probing waveguide output facets which, as in previous embodiments, preferably form an array 53 suitable to be coupled to a standard photodetector array. The probing waveguides 52 are curved to prevent stray light coupling to the output ports.

Figure 11:
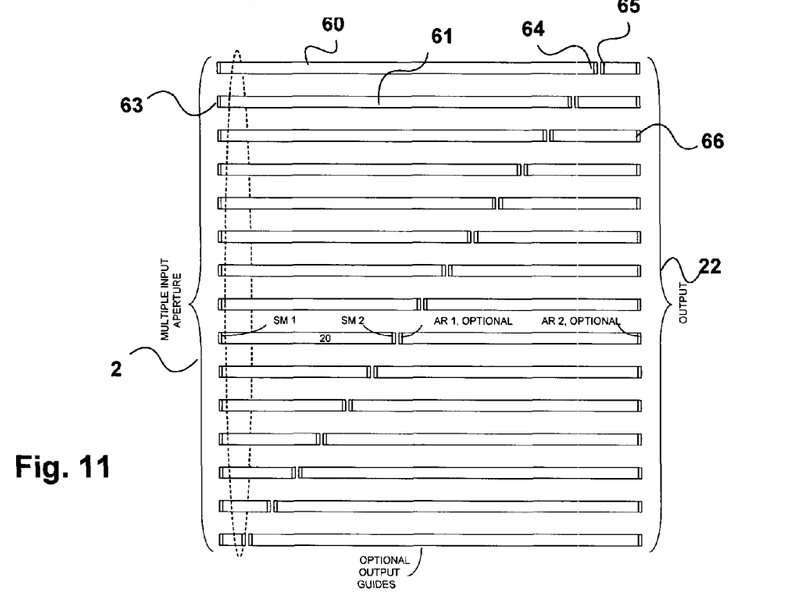
FIG. 11 shows an embodiment of the spectrometer with an array of FPI cavities formed by antireflective and partially reflecting means.

FIG. 11 shows yet another embodiment of the spectrometer with arrayed FPIs 60. Each waveguide FPI cavity is formed between semitransparent input mirror SM1 63 and output mirror SM2 64. The semitransparent mirrors 63 and 64 can be either metallic or dielectric layers, sub-wavelength grating structures, etc. Each FPI cavity is coupled via first antireflective interface AR1 65 (optional) to an output waveguide terminated with second antireflective interface 66. The AR interfaces can be formed for example using an anti-reflective dielectric coating or a sub-wavelength grating structure. The output light signal is intercepted and evaluated similarly as in the previous embodiment, i.e. using photodetector array and inversion methods.

Figure 12:
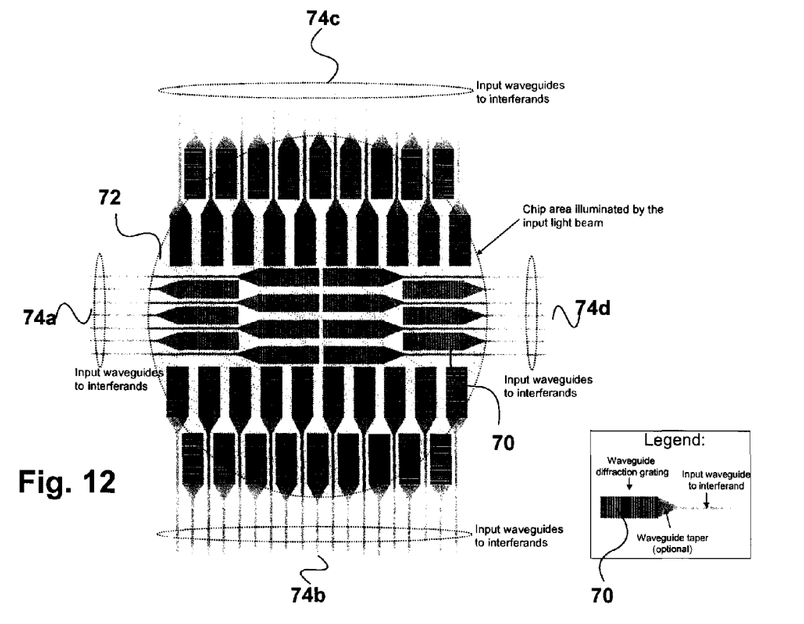
FIG. 12 shows a schematic example of 2D multi-aperture input comprising an array of grating waveguide couplers formed in the chip plane. The chip plane is positioned approximately perpendicular to the input optical beam.

In all the embodiments, the spectrometer etendue can be further increased by staggering the input waveguides, instead in one dimension along the chip input facet, into a two-dimensional (2D) input array formed in the plane of the chip, approximately perpendicular to the input beam. FIG. 12 shows an example of such arrangement, with a 2D multi-input aperture comprising an array of grating waveguide couplers 70 located in the chip plane 72. Each waveguide grating coupler 70 intercepts and diffracts a different spatial segment (wavelet) of the input beam incident approximately perpendicular to the chip plane. Thereby, each wavelet is coupled into the in-plane waveguide mode propagating in the input waveguide optically feeding a specific interferand 74. The interferands are arranged in groups 74a, 74b, 74c, 74d. The grating couplers can be advantageously blazed by techniques known in the art, to increase the coupling efficiency.

Figure 13:
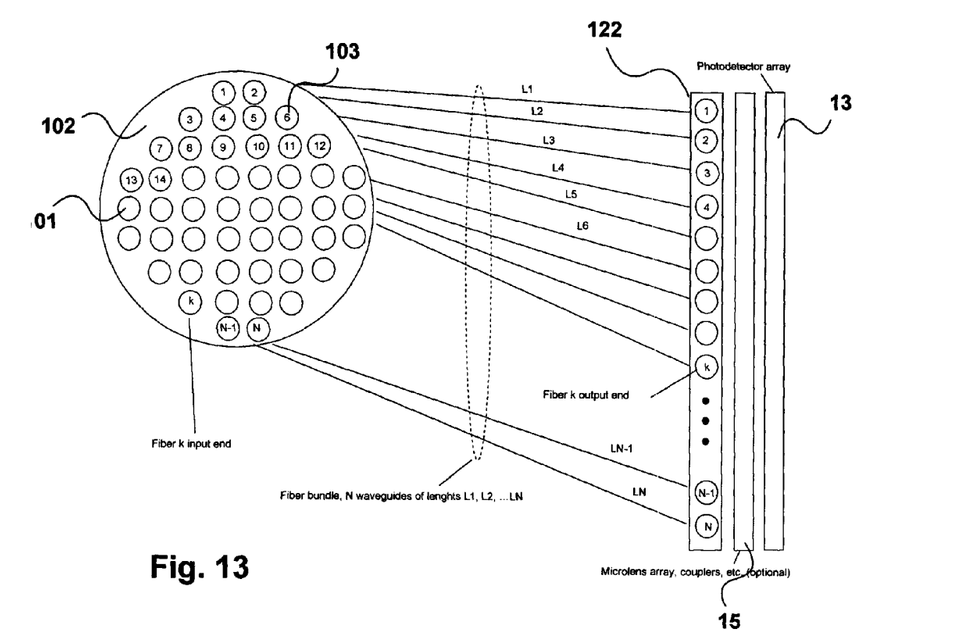
FIG. 13 shows a schematic of the multi-input aperture spectrometer where the arrayed waveguides are optical fibers.

FIG. 13 shows an embodiment of the multiaperture spectrometer where the arrayed waveguides are optical fibers. The light is coupled via a multi-input aperture 102 into an optical fiber array comprising N fibers 103. The fiber lengths vary so that specific light propagation delays are obtained between specific optical fiber pairs, for example F1, F2; F3, F4 etc. Optical path difference varies between the fiber pairs, for example fiber pairs F1 and F2; F3 and F4; F5 and F6; etc. It is advantageous to use a linearly increasing path difference between the waveguide pairs, but other (non-constant) path variations can also be used. The light from the two waveguides of each pair is recombined at the output aperture 122 (for example directly by beam overlap, or by a coupler, or by a microlens array, etc.). This yields a wavelength dependent signal with different periodicity for each waveguide pair. The light spectrum is calculated by an inversion formula. The input aperture is advantageously approximately circular to maximize the aperture overlap with the input optical field which is often approximately circular, whereas the output aperture can be advantageously rectangular (m×n=N or 1×k=N) to match a specific photodetector array, but other aperture formats can also be used. The resolution, which is dependent on the length of the waveguides can be made extremely high in this embodiment because the length of the optical fibers can be made very long, for example, in the order of kilometers if necessary.

Figure 14:
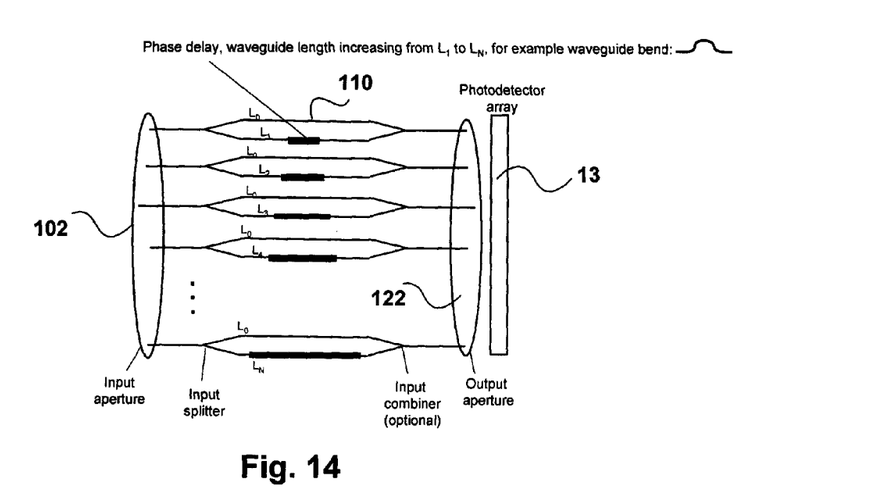
FIG. 14 shows a schematic of the multi-input aperture spectrometer using optical fiber splitting and combining means.

It can also be advantageous to divide each input waveguide in the optical fiber array by an 1×2 splitter into two separate fibers, thereby forming an array of MZ fiber interferometers 110, as it is shown in FIG. 14. This arrangement is particularly advantageous when the spatial coherence of the input light is shorter than the adjacent fiber separation in the input aperture. In analogy to the planar waveguide based embodiment shown in FIG. 3, the multi-input aperture input is formed by N optical fibers each feeding into an individual MZI. The input signal propagates through the arrayed MZIs and, as a result of interference, forms a spatially distributed power pattern across their output ports. The output power distribution is measured by a photodetector array and digitally processed to retrieve the input spectrum. The path difference $\Delta L_i$ in the MZI array changes by a constant increment across the array, though varying increments may also be used.

Figure 15:
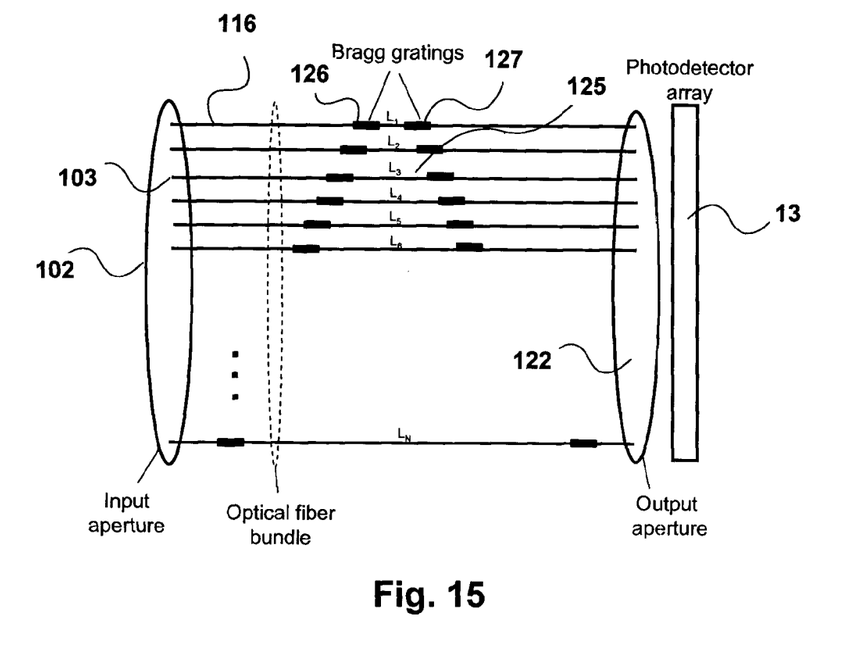
FIG. 15 shows a schematic of the multi-input aperture spectrometer using fiber array with fiber Bragg gratings.

FIG. 15 shows an embodiment of the multi-input aperture optical fiber spectrometer comprising an array of fiber Fabry-Perot resonators 125. By analogy to the planar waveguide embodiment shown in FIG. 6, the multi-input aperture 102 is formed by N optical fibers 116 feeding into an array of Fabry-Perot interferometers 125 with different cavity lengths, each cavity being formed by two fiber Bragg gratings 126, 127. The fiber Bragg grating reflectivity is typically in the range of 1-99.9999%, preferably 20-80%.

Figure 16:
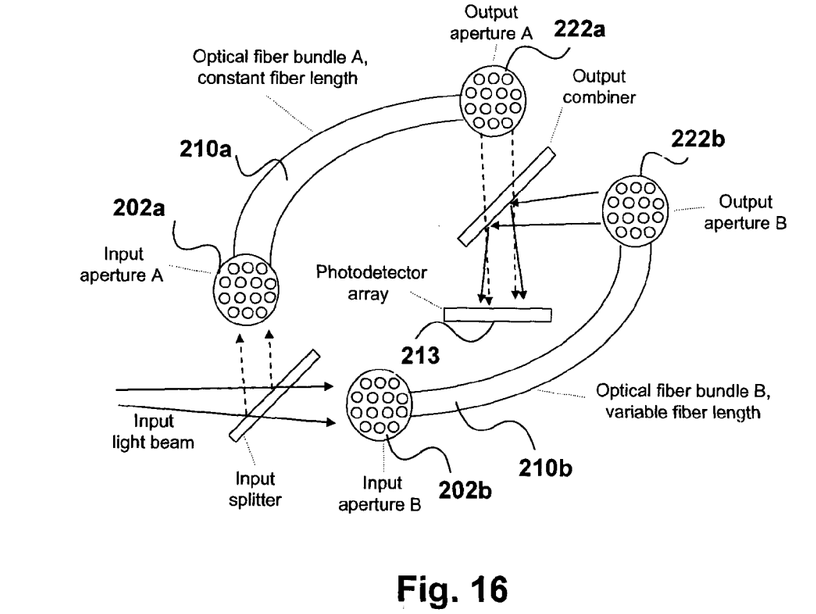
FIG. 16 shows a schematic of the multi-input aperture spectrometer using two optical fiber bundles arranged in a Mach-Zehnder configuration.

FIG. 16 shows a schematic of an embodiment of a multi-input aperture spectrometer using two separate optical fiber bundles 210a, 210b configured in a Mach-Zehnder interferometer configuration. Advantageously, one interferometer arm comprises a fiber bundle with a constant fiber length, while the other arm comprises a bundle with variable fiber lengths (however, variable fiber length can also be used in both arms). Instead of using a dedicated splitter and combiner for each MZI as in FIG. 14, this embodiment requires only one splitting and one combining element. The input aperture 202a of the first fiber bundle is positioned such that it coincides with the mirror image of the input aperture 202b of the second fiber bundle in the input splitter 215. Likewise, the output aperture 222a is positioned to coincide with the mirror image of the output aperture 222b in the output combiner 220. Both output apertures are imaged by a lens onto the photodetector array 213. This way, light from each fiber of the bundle 210a is recombined with light from a corresponding fiber of the bundle 210b. A spectrally-dependent spatial power distribution pattern is formed on the photodetector array and the input spectrum is retrieved by Fourier analysis.

Figure 17:
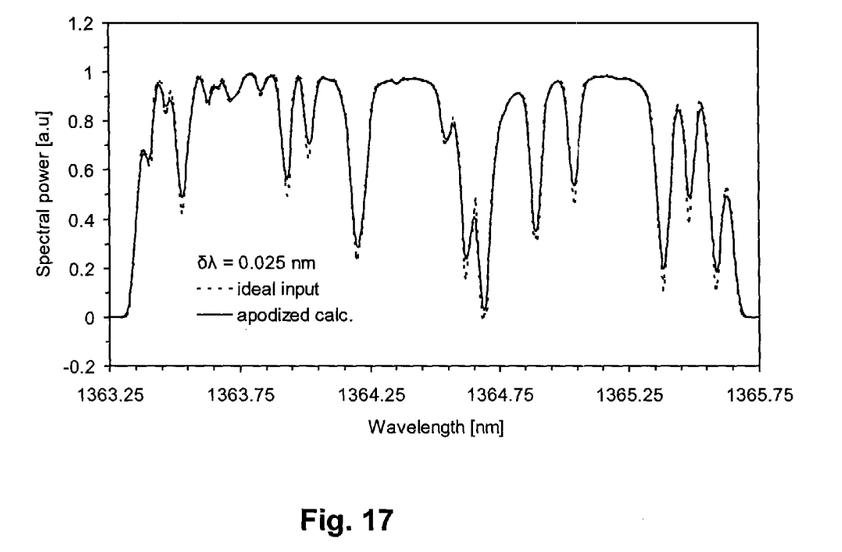
FIG. 17 shows simulated water absorption spectrum for a high resolution multiaperture spectrometer.

FIG. 17 illustrates the retrieval of the input light spectrum with a multiaperture microspectrometer for the spatial heterodyne observations of water (SHOW) experiment. SHOW experiment includes detection of water absorption bands on the solar irradiance background in the 2 nm wavelength range centered at 1364.5 nm. The SHOW experiment is described in detail in ref. Y. Lin, G. Shepherd, B. Solheim, M. Shepherd, S. Brown, J. Harlander, and J. Whiteway, "Introduction to spatial heterodyne observations of water (SHOW) project and its instrument development," Proc. XIV Int. TOVS Study Conf., 25-31 May 2005, Beijing, China, 835-843, 2005. It is assumed that the light at the spectrometer input has the spectral power distribution of water vapor at the altitude 15 km. The ideal input spectrum was obtained by using the pseudo-spherical multiple scattering radiative transfer model LIMB-TRAN, where temperature, pressure and $H_2O$ profiles were used with the Canadian Middle Atmosphere Model (CMAM) and line strengths were from the HITRAN 2004 database for high-resolution transmission molecular absorption. It is assumed that the signal input to the arrayed MZI is limited by a bandpass filter which attenuates all wavelengths beyond the spectral range $\Delta\lambda=2.5$ nm. The filter has a super-Gaussian transmission that is nearly flat within the 2 nm spectral range of interest (1363.5-1365.5 nm). The waveguide array comprises 200 MZ interferands with a maximum delay of 21 mm. It is noticed that the optical throughput of such device is increased by a factor of 200 compared to a single aperture device. The calculated spectrum is shown in FIG. 17, with most of the spectral features of the ideal input being correctly retrieved.

In addition to a largely increased éendue, an important advantage of the proposed principle is that the fabrication tolerances on waveguide lengths and optical path errors are largely relaxed. In most embodiments, light at the output of each interferand comprising the array can be intercepted independently from other interferands. Thereby, both phase and amplitude errors can be measured for each interferand as a part of the spectrometer calibration procedure. These errors can subsequently be eliminated by simple software calibration. This is impossible in conventional arrayed waveguide grating devices, where sophisticated phase error measurements and complex phase compensation fabrication steps may be required, particularly for devices with large chip areas.

Yet another obvious advantage is the possibility to vertically stack several chips to form a 3-D input aperture. In such arrangement the multi-waveguide aperture of each chip intercepts a different horizontal slice of an input field. Different chips can be designed for different spectral resolutions, bandwidths, etc.

The invention claimed is:

1. A spectrometer comprising:
   a multi-input aperture configured to admit an input wavefront from a spatially extended light source;
   an array of multiple waveguide structures terminating at said multi-input aperture such that said input wavefront is incident on each of said waveguide structures, and wherein said waveguide structures provide a dispersive function for said input wavefront, and pairs of elements of said waveguide structures are coupled together to form a plurality of interferometers, each interferometer having its own discrete input and output, and each interferometer having an optical path length difference (OPD) between optical paths therein, and wherein the OPDs for said interferometers are different, and wherein said interferometers produce at their outputs spectral components of the input wavefront;
   a detector array comprising detector elements for detecting the spectral components at the respective outputs of the interferometers on the detector array, the interferometers individually producing outputs at said detector elements that are periodic functions of wavelength; and
   a processor configured to superpose the spectral components to obtain the spectrum of the input wavefront.

2. A spectrometer as claimed in claim 1, wherein a delay introduced by a first waveguide element of each pair increases or decreases incrementally across the array.

3. A spectrometer as claimed in claim 1, wherein said interferometers comprise directional couplers to control the wavelength response of each interferometer.

4. A spectrometer as claimed in claim 3, wherein the length of said directional couplers is defined by overlapping portions of waveguide elements forming said waveguide structures.

5. A spectrometer as claimed in claim 1, comprising two groups of fiber bundles terminating at respective input apertures, an input splitter directing incoming light to said respective input apertures, each of said bundles terminating at respective output apertures, and an output combiner for combining the outputs of the respective bundles.

6. A spectrometer as claimed in claim 5, wherein the output combiner images said outputs onto a photodetector array such that output light from respective pairs of fibers from each bundle is combined at said photodetector array.

7. A spectrometer as claimed in claim 5, wherein at least one of said bundles comprises fibers of variable length.

8. A spectrometer comprising:
   a multi-input aperture configured to admit an input wavefront from a spatially extended light source;
   an array of multiple waveguide structures terminating at said multi-input aperture such that said input wavefront is incident on each of said waveguide structures, and wherein said waveguide structures provide a dispersive function for said input wavefront, and pairs of elements of said waveguide structures are coupled together to form a plurality of interferometers, each interferometer having its own discrete input and output, and each interferometer having an optical path length difference (OPD) between optical paths therein, and wherein the OPDs for said interferometers are different, and wherein said interferometers produce at their outputs spectral components of the input wavefront;
   a detector array comprising detector elements for detecting the spectral components at the respective outputs of the interferometers; and
   a processor configured to superpose the spectral components to obtain the spectrum of the input wavefront,
   wherein a delay introduced by a first waveguide element of each pair increases or decreases incrementally across the array, and
   wherein a delay introduced by a second waveguide element of pair is constant across the array, and wherein the outputs of said interferometers are superimposed at said detector array.

9. A spectrometer as claimed in claim 8, wherein each pair of waveguide elements forms a Mach-Zehnder interferometer.

10. A spectrometer as claimed in claim 9, wherein each said pair of waveguide elements of each waveguide structure is coupled into respective input waveguides at said input aperture.

11. A spectrometer comprising:
    a multi-input aperture configured to admit an input wavefront from a spatially extended light source;
    an array of multiple waveguide structures terminating at said multi-input aperture such that said input wavefront is incident on each of said waveguide structures, and wherein said waveguide structures provide a dispersive function for said input wavefront, and pairs of elements of said waveguide structures are coupled together to form a plurality of interferometers, each interferometer having its own discrete input and output, and each interferometer having an optical path length difference (OPD) between optical paths therein, and wherein the OPDs for said interferometers are different, and wherein said interferometers produce at their outputs spectral components of the input wavefront;
    a detector array comprising detector elements for detecting the spectral components at the respective outputs of the interferometers; and a processor configured to superpose the spectral components to obtain the spectrum of the input wavefront, and
wherein a delay introduced by a first waveguide element of each pair increases incrementally across the array, and a delay introduced by a second waveguide element of each pair decreases incrementally across the array.

12. A spectrometer comprising:
an multi-input aperture for admitting an input wavefront;
an array of multiple waveguide structures terminating at said multi-input aperture such that said input wavefront is incident on each of said waveguide structures, and wherein said waveguide structures provide a dispersive function for said input wavefront and elements of said waveguide structures form a plurality of interferometers, each having an optical path length difference (OPD) between optical paths therein, and wherein the OPDs for said interferometers are different, and wherein said interferometers provide a wavelength responsive output for spatially extended light sources; and
a detector array receiving an output of said plurality of interferometers,
wherein said interferometers comprise directional couplers to control the wavelength response of each interferometer,
wherein the length of said directional couplers is defined by overlapping portions of waveguide elements forming said waveguide structures, and
wherein the length of the directional couplers increases progressively across the array of waveguide structures.

13. A spectrometer comprising:
an multi-input aperture configured to admit an input wavefront from a spatially extended light source;
an array of multiple waveguide structures terminating at said multi-input aperture such that said input wavefront is incident on each of said waveguide structures, and wherein said waveguide structures provide a dispersive function for said input wavefront and comprise Fabry-perot interferometers to introduce an optical path length difference (OPD) between optical paths therein, and wherein the OPDs for said interferometers are different, and wherein said interferometers produce at their outputs spectral components of the input wavefront;
a detector array comprising detector elements for detecting the spectral components at the respective outputs of the interferometers; and
a processor configured to superpose the spectral components to obtain the spectrum of the input wavefront,
wherein said Fabry Perot interferometers are formed in a slab waveguide and have reflective or partially reflective surfaces at an input and output of said slab waveguide, and wherein said Fabry Perot interferometers have different lengths within said slab waveguide.

14. A spectrometer as claimed in 13, wherein the delay varies incrementally across the array of interferometers.

15. A spectrometer as claimed in claim 13, wherein each interferometer has an input taper at said multi-input aperture.

16. A spectrometer as claimed in claim 13, wherein said Fabry Perot interferometers include Bragg gratings at each end.

17. A spectrometer as claimed in claim 13, wherein said Fabry Perot interferometers are arranged in an elbow configuration.

18. A spectrometer as claimed in claim 17, wherein said Fabry Perot interferometers are arranged in an offset configuration between the multi-input aperture and a multi-port output.

19. A spectrometer as claimed in claim 13, wherein a plurality of waveguides connect said Fabry Perot interferometers to a multiport output.

20. A spectrometer as claimed in claim 19, wherein said waveguides are curved and arranged on a slab in varying lengths between facets of said slab, said facets forming the multi-input aperture and output ports of said spectrometer.

21. A spectrometer as claimed in claim 19, wherein said waveguides are arranged in a single or double elbow configuration on said slab.

22. A spectrometer as claimed in claim 13, wherein each waveguide structure comprises two sequential waveguide elements, a first said waveguide element having semitransparent mirrors at opposite ends thereof to form said Fabry-Perot interferometers, and said second waveguide element extending from an output of the Fabry-Perot interferometer to an output port, and wherein the length of the first waveguide element progressively increases or decreases across the array, and the length of the second waveguide element progressively decreases or increases across the array in a complementary manner.

23. A spectrometer as claimed in claim 22, wherein the second waveguide elements have anti-reflective coatings at opposite ends thereof.

24. A spectrometer as claimed in claim 23, wherein said redirector comprises a grating coupler.

25. A spectrometer as claimed in claim 13, wherein said waveguide structures comprise optical fibers, and wherein each optical fiber includes Bragg gratings to form said Fabry-Perot interferometers within said optical fibers.

26. A spectrometer as claimed in claim 25, wherein the separation of the Bragg gratings increases or decreases incrementally across the array.

27. A spectrometer comprising:
a multi-input aperture configured to admit an input wavefront from a spatially extended light source;
an array of multiple waveguide structures terminating at said multi-input aperture such that said input wavefront is incident on each of said waveguide structures, and wherein said waveguide structures provide a dispersive function for said input wavefront, and pairs of elements of said waveguide structures are coupled together to form a plurality of interferometers, each interferometer having its own discrete input and output, and each interferometer having an optical path length difference (OPD) between optical paths therein, and wherein the OPDs for said interferometers are different, and wherein said interferometers produce at their outputs spectral components of the input wavefront;
a detector array comprising detector elements for detecting the spectral components at the respective outputs of the interferometers; and
a processor configured to superpose the spectral components to obtain the spectrum of the input wavefront, and
wherein said waveguide structures are arranged in a plane, and each waveguide structure has an input with a redirector for admitting light normal to said plane and redirecting said light into said waveguide structures, which lie in said plane.

28. A spectrometer as claimed in claim 27, wherein said groups of said waveguide structures are arranged in orthogonal directions in said plane.

29. A spectrometer comprising:
a multi-input aperture configured to admit an input wavefront from a spatially extended light source;
an array of multiple waveguide structures terminating at said multi-input aperture such that said input wavefront is incident on each of said waveguide structures, and wherein said waveguide structures provide a dispersive function for said input wavefront, and pairs of elements of said waveguide structures are coupled together to form a plurality of interferometers, each interferometer having its own discrete input and output, and each interferometer having an optical path length difference (OPD) between optical paths therein, and wherein the OPDs for said interferometers are different, and wherein said interferometers produce at their outputs spectral components of the input wavefront;

a detector array comprising detector elements for detecting the spectral components at the respective outputs of the interferometers; and a processor configured to superpose the spectral components to obtain the spectrum of the input wavefront, wherein said waveguide structures comprise pairs of optical fibers, and wherein the lengths of the optical fibers of each pair are different to provide said interferometers, each pair of optical fibers being coupled to a respective output port.

30. A spectrometer as claimed in claim 29, wherein the inputs to said optical fibers at said multi-input aperture are located in a two-dimensional array.

31. A spectrometer as claimed in claim 29, further comprising input splitters coupling said multi-input aperture input to said pairs of optical fibers to form Mach-Zehnder interferometers.

32. A method of analyzing the spectral composition of an input wavefront, comprising:

admitting a wavefront from a spatially extended source into a multiple input aperture comprising a plurality of waveguide structures, wherein said waveguide structures are in the form of interferometers providing a dispersive function for said input wavefront, each interferometer having an optical path length difference (OPD) between optical paths therein, and wherein the OPDs for said interferometers are different, and wherein said interferometers produce at their outputs spectral components of the input wavefront;

detecting the spectral components at the respective outputs of the interferometers with an array of detector elements; and obtaining the spectrum of the input wavefront by superposing the spectral component, wherein said interferometers individually produce outputs at said detector elements that are periodic functions of wavelength.

33. A method as claimed in claim 32, wherein said interferometers are Mach-Zehnder interferometers.

34. A method as claimed in claim 32, wherein said interferometers are Fabry-Perot interferometers.

35. A method as claimed in claim 32, wherein the input wavefront is directed into an input aperture comprising a bundle of optical fibers providing said waveguides, and said optical fibers are arranged in pairs of different lengths to form said interferometers.

36. A method as claimed in claim 32, wherein the input wavefront is directed to a beam splitter and directed to separate bundles of optical fibers forming said waveguides, and wherein light from pairs of said optical fibers, one from each bundle, is combined at an output combiner to form an output for detection by a photodetector.

* * * * *